Figure 11:
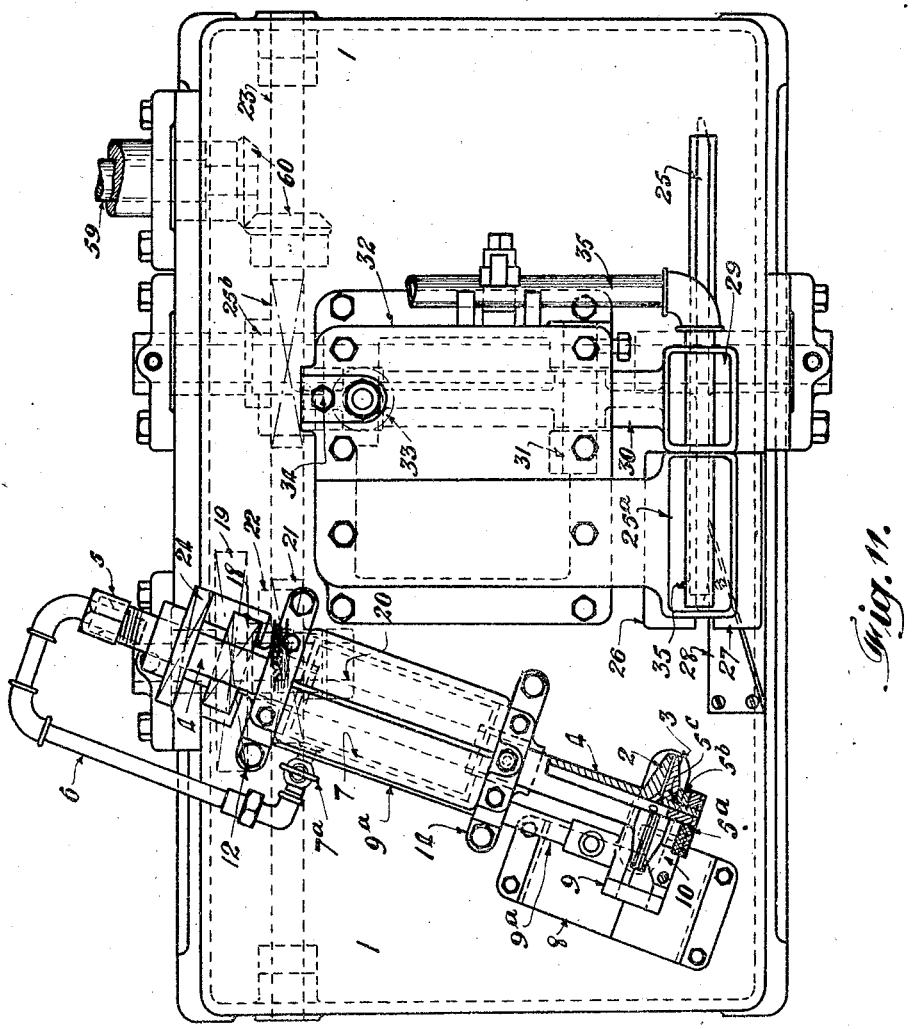

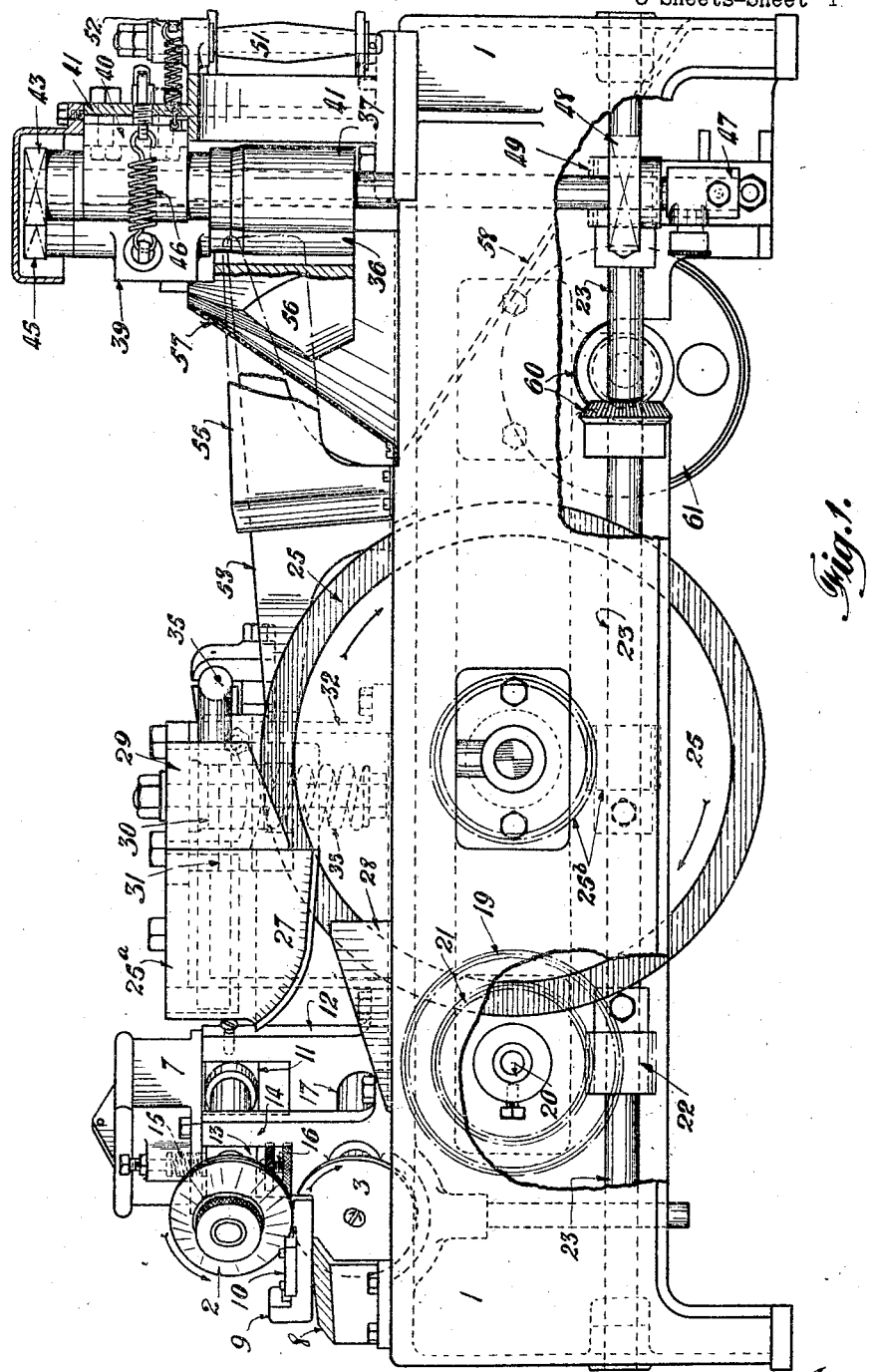

July 6, 1926.
T. WARDROP ET AL
1,591,931
LAUNDRY COLLAR FINISHING MACHINE
Filed April 14, 1924   8 Sheets-Sheet 2
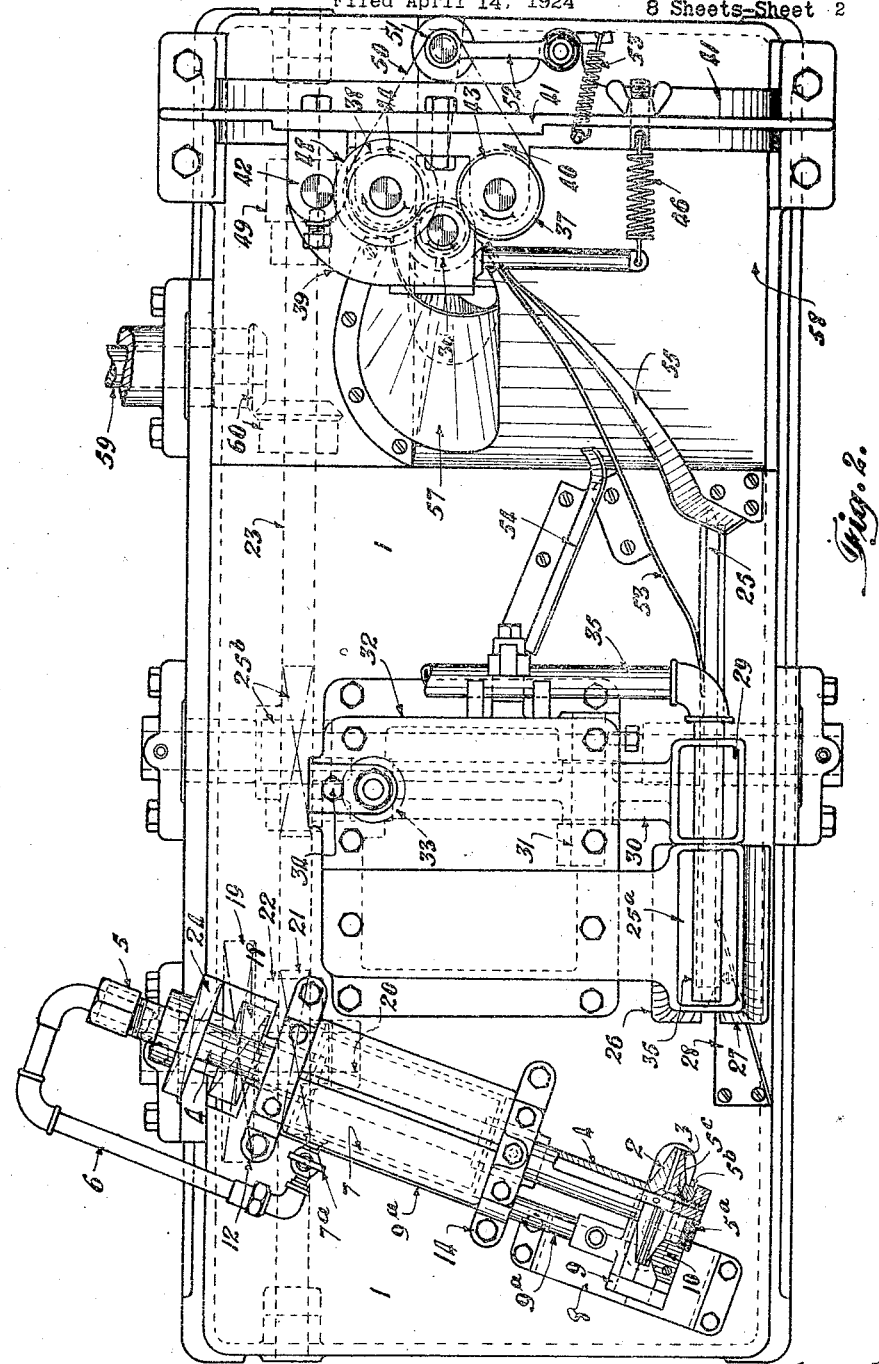

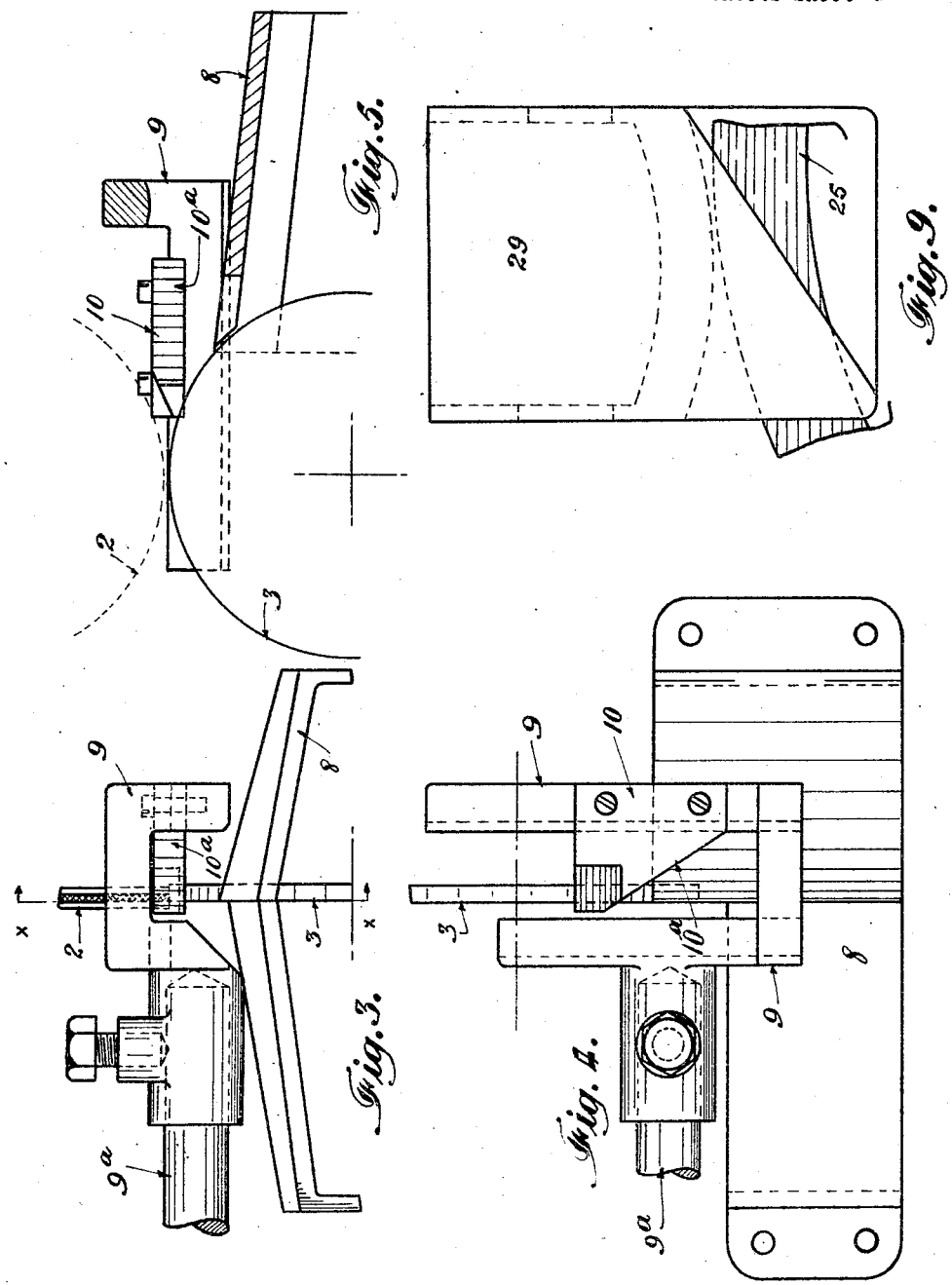

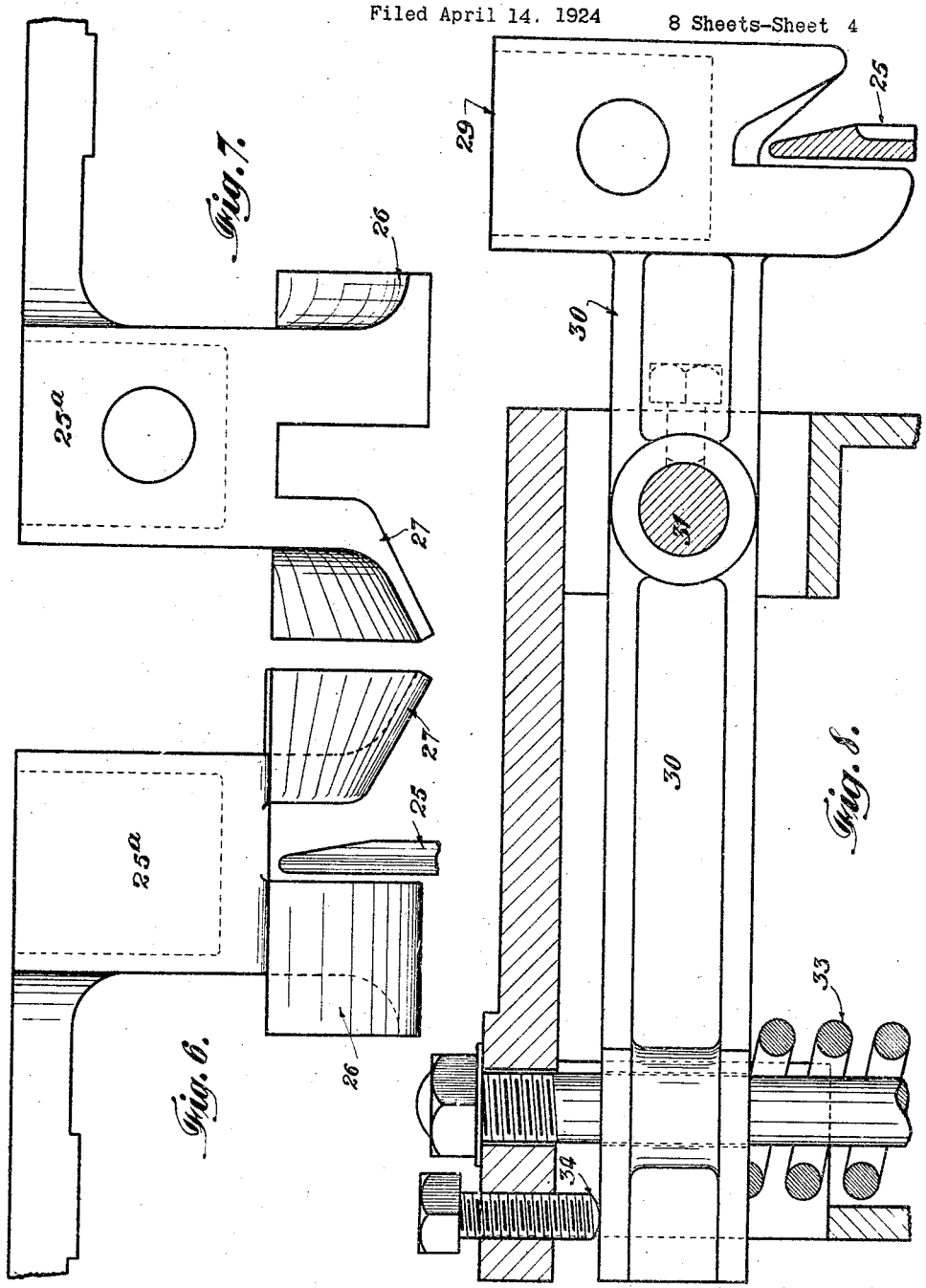

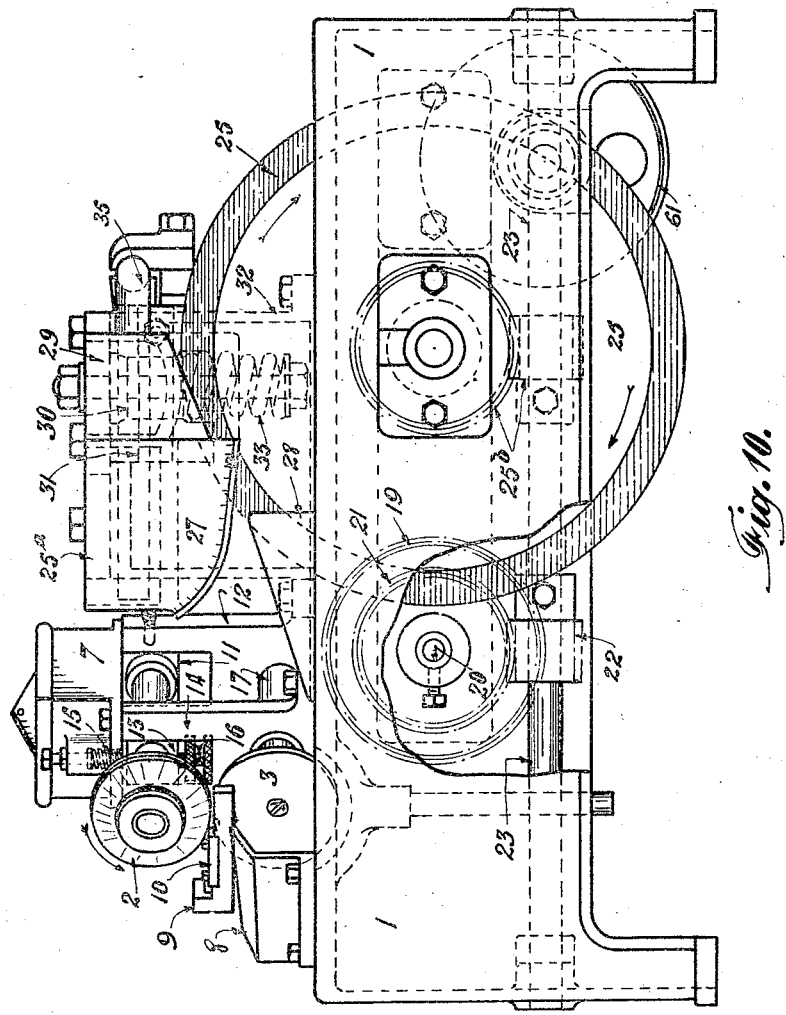

July 6, 1926. 1,591,931
T. WARDROP ET AL
LAUNDRY COLLAR FINISHING MACHINE
Filed April 14, 1924 8 Sheets-Sheet 6

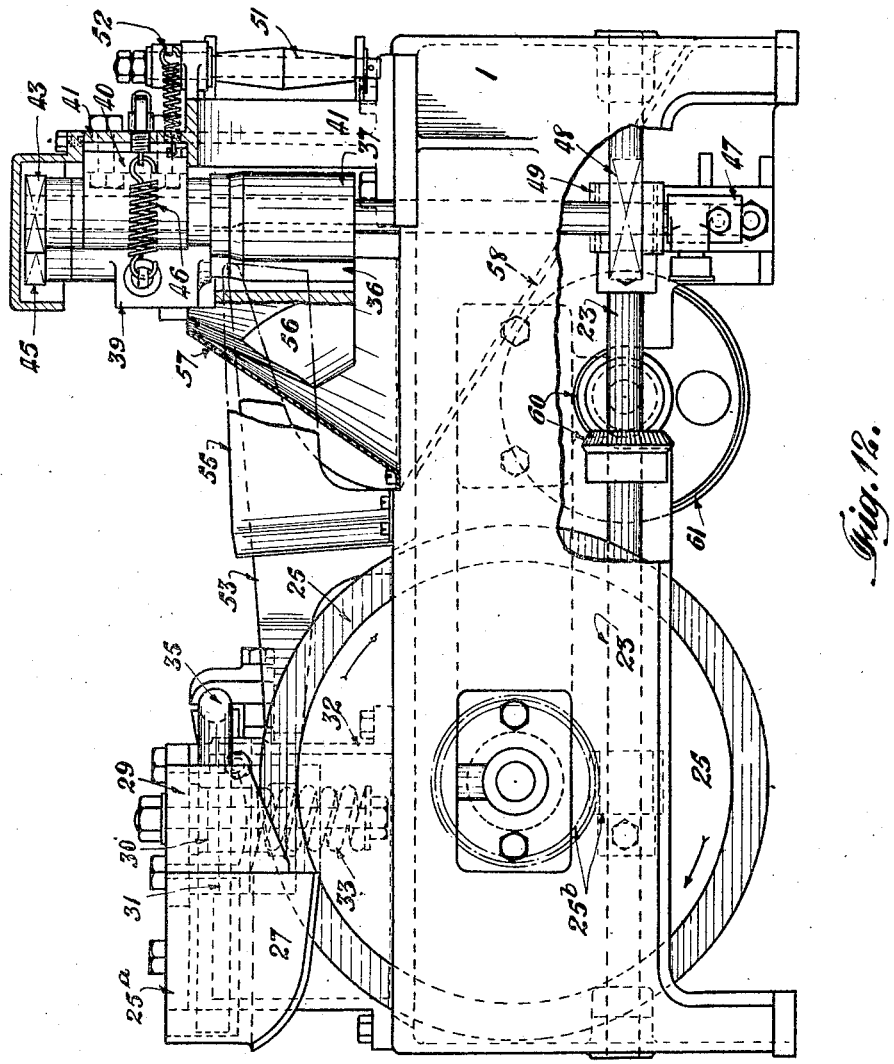

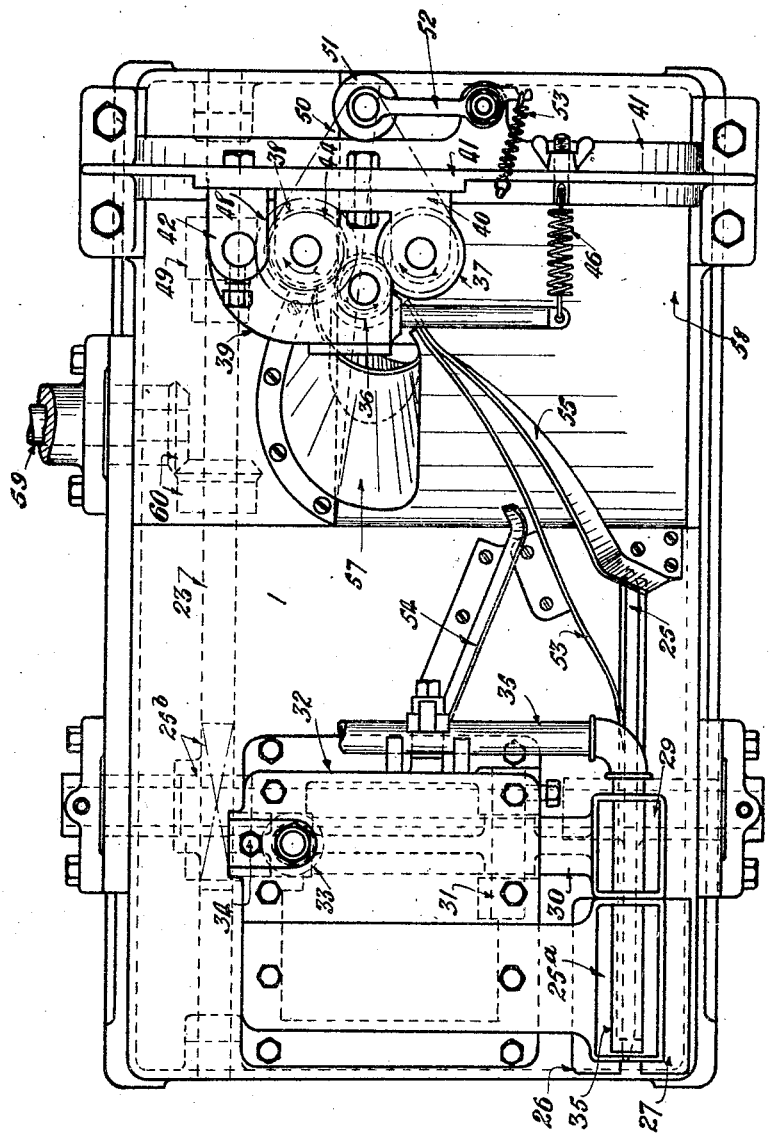

Patented July 6, 1926.

1,591,931

UNITED STATES PATENT OFFICE.

THOMAS WARDROP AND JOHN CHANT, OF MANCHESTER, ENGLAND.

LAUNDRY COLLAR-FINISHING MACHINE.

Application filed April 14, 1924. Serial No. 706,500, and in Great Britain April 26, 1923.

This invention refers to the laundry finishing of double-fold collars after being washed, starched and ironed in the flat, and consists of a machine through which said collars may be passed and automatically subjected to a series of successive operations, the machine allowing for variations in curvature and size of collars, both before and after folding. In one example of said machine, the collars are first dampened alongside the seam, then folded along the dampened portion, then ironed at the fold, and finally "curled". In another example, the collars are first dampened alongside the seam, then folded along the dampened portion and finally ironed at the fold. In a further example, the collars are first folded (having been previously dampened by hand or in another machine) then ironed at the fold and finally "curled".

In a linen or other double-fold collar, the seam which connects the inner with the outer thickness follows a curved path from end to end of the collar, the radius of which is large when in the flat, but which is somewhat less when the collar is folded, and still less when curled. Further, some collars have very little curve, while others have a very pronounced curve. The curve also varies with the size or make of collar.

Any continuous treatment of double-fold collars to be successful has to make allowance for the differences in radii, size and make, and both in the flat, and after folding, and this, apart from other difficulties, is not easy of accomplishment.

In a machine made according to the present invention, provision is successfully made for allowing of the said variations in curvature or differences in size or make of collars, and also the changes of radii as the collars pass from one operation to another, and by enabling the collars to be treated continuously, and without the intervention of hand labour, the collars can be treated more rapidly than heretofore.

According to the invention, the machine in one example comprises a "dampener" preferably of the rotary type, arranged to dampen a collar while in the flat alongside the seam, and either on the top face only, or on both the top and bottom faces, or bottom face only. The dampener is mounted above the machine table and resting on the table is a guide which lies in such relation to the dampener that a collar in the flat fed endwise to the dampener is supported and led by the guide to the dampener. Said guide may also serve to impart a slight initial fold to the collar. When the dampener is of the rotary wheel type it also serves to feed the collars through the machine, but when the dampener is of other than the rotary type, separate feed rollers or wheels will be provided.

Following the dampener is a "folder" which as a collar passes forward, folds it along the dampened part next the seam, the degree of fold being preferably such as to cause the inner and outer thicknesses of the collar to lie at an angle of about 19° to each other. As it leaves the folder, the collar is acted upon by an "ironer" which further folds the collar and also irons the fold to give it the required roundness and polish. After leaving the ironer, the collar passes to a "curler", consisting of rollers which squeeze or press the collar at all points except at the fold and thereby complete the folding. The rollers also give to the collar a curled set. As each collar passes from the "ironer" to the "curler", it is led on to a plate or blade with inclined top edge which directs the collar to the upper ends of the curler rollers, where all but the fold of the collar can be acted upon by the rollers. Adjacent guiding surfaces help to hold the collars to the plate as they move forward.

The "curler" is preferably of a kind which permits of the curled collars leaving the curler rollers in a downward direction, and in such connection further guiding surfaces are provided to cause the curled collars to pass downwards, and finally drop into a basket or other receptacle.

The dampener and folder lie in positions relatively to each other which ensure that the collars, as they emerge from the dampener, shall easily pass into engagement with the parts of the folder in the right path and said positions are also such that that portion of a collar between the dampener and folder is of a length such as to give a degree of flexibility sufficient to accommodate an almost straight collar and a collar with a pronounced curve. The ironer and curler are similarly disposed to accommodate the smaller curvature of a collar after folding and ironing, as also the intermediate guide plate. Usually the positions of the dampener and folder will be in the path of a curve approximating to the average curve of the seam of a man's double-fold collar in the flat, and the positions of the ironer and curler will be in the path of a curve approximating to the average curve of the same collar after folding but before curling.

The machine will be hand or power driven. The dampener (if of the rotary type), the movable part of the ironer, and the curler rollers will be driven at speeds at which the collars will not be subjected to any undue tension at any part and will pass smoothly through the machine.

Upon the accompanying diagrams:

Fig. 1 illustrates a side elevation (partly broken away) and

Fig. 2 a plan of a double-fold collar dampening, folding, ironing and curling machine constructed according to the invention.

Fig. 3 illustrates a front view,

Fig. 4 a plan, and

Fig. 5 a sectional side elevation on line x—x of Fig. 3 of a guide used with the dampener, and Figs. 6 and 7 illustrate front and rear views respectively of the collar folder.

Fig. 8 illustrates a side elevation, and

Fig. 9 an end elevation of a collar ironer and its support, the latter being in section.

Fig. 10 illustrates a side elevation, partly broken away, and

Fig. 11 a plan of the improved machine without the curling mechanism.

Figs. 12 and 13 are like views of the machine without the dampener.

Referring to Figs. 1 and 2, the machine therein shown comprises an elongated stand or table 1 with its top face level and suitable for carrying the main working parts, the mechanism for driving said parts being arranged below the table top. At one end of said table is arranged the collar dampener, consisting of two wheels 2, 3, running one above but slightly out of the plane of the other. The wheel 3 is a single disc, but the wheel 2 is composed of two discs (or a disc and a flange) and an intermediate felt or like porous washer (see Fig. 2), one of said discs being adjustable relatively to the other disc in order to compress the porous washer to any desired extent. The shaft 4 carrying the wheel 2 is hollow and at its other end is connected through a suitable gland box 5 and pipe 6 with a water reservoir 7. With water free to flow to the washer the latter becomes saturated, and deposits a film of water on, and moistens the surface with which the wheel contacts.

Immediately in front of the dampener wheels, is a guide or support 8 for supporting the forward end of the collar, while being fed to the dampener wheels, and above said guide or support are means for holding the collar down and in contact with the support. The support is preferably slightly arched, see Fig. 3, and in conjunction with the means for holding the collar down which may consist of a forked presser foot 9, imparts a slight initial fold to the collar as it passes to the dampener, such initial folding being helpful in giving the collar a natural tendency to travel in the line of its fold alongside the seam.

The presser foot 9 is carried by a rod 9ª, and the under faces of its two parallel parts which lie to right and left of the wheel 3, are bevelled, see Fig. 3, by which and the guide 8 and wheel 3 the aforesaid initial folding is effected. By means of a small metal block 10 on the presser foot the "lock" of the collar is turned up out of the line of the dampener wheels, as the collar moves forward and the "lock" meets the bevelled edge 10ª of said block, thereby preventing the lock being dampened.

The shaft 4 of the rotary dampener wheel 2 is journaled at one part in a bearing 11 pivoted in stationary brackets 12 and at another part in a bearing 13 capable of rising and falling in the stationary bearing brackets 14. A regulatable spring 15 serves to yieldingly hold the bearing 13 against an adjustable stop 16, see Fig. 1, whereby the upper dampener roller 2 is caused normally to lie close to the wheel 3. Upon the shaft 17 of the bottom dampener wheel 3 is a toothed skew gear wheel 18 which gears with a larger skew wheel 19 carried on a short stub axle 20 below the table top. Upon said axle and in one with or connected to the wheel 19 is a worm wheel 21 adapted to mesh with and receive motion from a worm 22 carried by the main shaft 23 extending from end to end of the machine.

Keyed to the shaft 5 is a spur wheel 24, which meshes with a like wheel on the lower shaft 17, the teeth of these wheels being sufficiently deep to allow of the tilting of the shaft 5.

Next the dampener is arranged the folder which comprises a large rotary wheel 25 and a gas-heated box 25ª, with downwardly projecting flanges 26, 27, the flanges being curved downwards from the end nearest the dampener, and at the deeper end lying astride the periphery of the wheel 25, see Figs. 1 and 6.

As a collar leaves the dampener it meets the curved edges of the flanges 26 and 27, and is guided by them into contact with the wheel 25, which thereupon forces the middle portion of the collar upwards, while the flanges hold down the side parts. In such way and with the flanges heated the collar is folded to the extent required along the moistened part.

To assist in guiding a comparatively straight collar to the folder a small guide 28 is provided, said guide consisting of a strip of metal with its lower part secured to the table of the machine and its upper part lying at an angle to the plane of the wheel 25, the vertical part also being inclined upwardly (Fig. 1) towards the wheel 25 to ensure of the collar being guided on to such wheel.

As clearly shown in Fig. 2, the dampening wheel shafts and the disc wheel shafts are other than parallel and in the example shown lie at an angle to each other of about 19° which has been found to give satisfactory results, the dampener wheels and disc wheel occupying the positions shown.

The disc wheel 25 is driven through worm and worm wheel 25$^b$ gearing from the shaft 23.

Alongside the gas-heated folder box 25$^a$ is a further gas-heated box 29 constituting the ironer, said box being carried at the end of a lever-like part 30, fulcrumed on a pin 31, carried by a stand or support 32 on the machine table. The underside of the ironer box is made saddle shape see Fig. 8, and fits astride the periphery of the disc wheel 25. At the entrance of the ironer next the folder, the ironer is bevelled inwardly, see Fig. 8, the width or angle of the groove being slightly less than that of the folder. As, therefore a collar leaves the folder and is carried forward by the wheel 25, the collar is further folded, and simultaneously the ironer effects the required ironing and glazing of the fold.

The ironer is free to rise and fall, but is held yieldingly against the collar by a regulatable spring 33. A regulatable stop 34 serves to keep the ironer clear of the disc wheel when no collars are passing.

The folder and ironer boxes are heated by a gas-burner common to both, the holes in the ends of the box 29 being large enough to allow of the box moving vertically. On the stand 32 means are provided for supporting the gas supply pipe 35. Electric heating means may be used in place of gas.

The periphery of the disc wheel 25 is comparatively thin and rounded, the other portions of the wheel being thicker, see Fig. 8.

As the collar leaves the ironer it passes forward to the curler which is arranged at an appropriate distance therefrom, and usually such as to suit the shortest make of collar. The curler comprises three rollers 36, 37, 38 the spindles of which are carried by brackets 39, 40, respectively, the bracket 40 being stationary and fixed to cross-bridge 41, and the bracket 39 being hingedly mounted on a further bracket 42 also secured to the cross-bridge 41. The spindles of the rollers 37, 38 at their top ends are provided with gear wheels 43, 44 and the spindle of the roller 36 is provided at its top end with a gear wheel 45, this latter normally meshing with the wheels 43, 44 under the tension of a spring 46. The rollers 37, 38 are rubber-covered, while the roller 36 which is of smaller diameter, is a plain polished metal roller. At their top ends the rollers are shouldered down or bevelled, in order to leave a space for the fold of the collar when passing between the rollers.

The spindle of the roller 38 extends downwards into the table 1, and rotatably fits a foot-step bearing 47. Keyed to said roller spindle is a worm wheel 48, which gears with a worm 49 on the main shaft 23.

Encircling the rollers 37, 38 is an endless canvas or like belt 50, which also engages a jockey or tensioning pulley 51, carried by a lever 52 controlled by spring 53. The canvas or other belt 50 being in tension bears against the roller 36, and the spring 46 holds the roller 36 and canvas belt 50 against the rollers 37, 38. The folded and ironed collar on leaving the ironer, passes forward to the curler and on its way is supported and guided in a slightly upwards direction by a fixed plate 53, the upper edge of which is inclined or set at an angle, the highest part being next the rollers, and such highest part being on a level with the shouldered down upper parts of said rollers, see Fig. 1.

The plate 53 is other than straight looked at in plan (Fig. 2), and is thereby adapted to guide the collars in a path agreeable with the curvature of the collar after ironing and before curling. To counteract any tendency of the collar to drop after leaving the ironer, the latter is arranged slightly in advance of the highest part of the disc wheel 25 which has the effect of tilting the advancing end of the collar upwards. To further guide the collars, additional guide plates 54, and 55 are provided which also help to control the passage of the collars as they approach the curling rollers.

On reaching the curling rollers a folded and ironed collar passes between the roller 36 and the canvas belt 50, and is carried between the rollers 36, 37 and 38 which under the tension of the spring 46, flatten or squeeze the two thicknesses of the collar together (except at the fold) and thereby complete the folding operation. At the same time, the rollers owing to their disposition, and owing also to the fact that the roller 36 rotates at a slightly slower peripheral speed than the rollers 37, 38 impart a curl to the collar as a whole. As the collar leaves the roller it tends to follow a circular path, and if left unrestricted would tend to again pass between the rollers, but to prevent this and to allow its forward end to pass its tail, and also to enable the collar to leave the rollers, a conical block 56 is provided around which the collar travels, and by which and a conical sheet metal guide 57, the collar is directed downwards in a spiral path, the pitch of which is such that the forward end of the collar passes below its tail end and the collar finally falls into the chute 58 and from thence into a basket. The block 56 is adjustably screwed to the bracket 39 and the guide 57 is secured to the table top.

Delivering the curled collars spirally downwards does not affect the curled set given to the collars by the curler rollers.

Owing to the shouldered down parts of the curler rollers, the fold of the collar is not acted upon by the rollers, but remains round instead of sharp. The curler roller spindles will preferably be lubricated by solid grease lubricant arranged within the bearings in such manner as to prevent the lubricant reaching the outer surfaces of the rollers.

The guides 53 and 55 (as shown in chain lines in Fig. 1) are cut away at the parts next the table to allow room for the collar to pass below it as it descends into the chute. The guide plate 55 is slightly higher than the guide plate 53 and both guides 54, 55 incline towards the top edge of the guide 53, see Fig. 2. The main shaft 23 is driven from the power shaft 59 through bevel wheels 60 and on the power shaft is a pulley 61 and controlling clutch (not shown).

The peripheral speeds of the dampener rollers, ironer disc wheel, and curler rollers will be approximately uniform except the roller 36 which as aforesaid runs at a slightly lower peripheral speed for the purpose of giving curl to the collar. The amount of moisture delivered by the dampener wheel 2 may be regulated by the tap $7^a$, or by the nuts $5^a$ and the adjustable disc part of the wheel, a small collar $5^b$ and ring $5^c$ of packing being provided to prevent leakage along the screwed part of the wheel shaft. Holes are drilled in the wheel shaft to allow the water to reach the porous washer.

Suitable guards will be provided for the gear wheels of the dampener and also for the gear wheels of the curler rollers.

The lower dampener wheel may run in a small depression in the table top 1 and said depression may have at its lowest point a pipe for carrying away any excess water, which may drain into a cup placed below such pipe. Whilst preferring to use a rotary dampener, any other and suitable kind of dampener may be employed; further, a rotary dampener of other than the particular construction described may be used. A modified construction of folder, ironer or curler may also be used in place of that described, the essential feature of this invention being a machine which allows of dampening, folding, ironing and curling being performed as a continuous operation in the manner described.

Although the machine is designed for carrying out the operations of dampening, folding, ironing and curling, it will be understood that it may be used for certain of the operations only, viz: dampening, folding and ironing or folding, ironing and curling.

In Figs. 10 and 11 the machine is without the curling mechanism, while in Figs. 12 and 13 the machine is without the dampener. These modifications are substantially the same as the corresponding parts of the complete machine, and do not call for any further description.

What we claim is:—

1. A machine for laundry-finishing double-fold collars comprising a table, a rotary dampener on said table and near one end, a collar guide in front of said dampener, a collar folder to the rear of said dampener, and a collar ironer next the folder, these latter comprising a large rotary disc and two inverted channel-shaped metal blocks, one overlying the highest part of the disc, and the other partly overlying said disc and extending towards the dampener and its sides being curved downwards from the end next the dampener, the axis of the said disc being inclined in plan to the axis of the dampener, a series of curling rollers at that end of the table farthest from the dampener, between which the collars, after being ironed at the fold, pass and by which they are given a curled set, guides for leading the collars from the ironer to the curling rollers, and further guides for directing the curled collars as they leave the rollers and causing them to have a downward movement, as set forth.

2. A machine for laundry finishing double-fold collars, comprising a dampener, a folder comprising a rotary disc wheel and a heated saddle-shaped member, part of which lies astride the disc wheel, an ironer comprising a further heated saddle-shaped member also lying astride the said disc wheel, the shafts of the dampener wheels being inclined to the shaft of the disc wheel in plan, and the dampener wheels and disc wheel being arranged in positions which cause the collars to pass from one to the other in the line of the seam, an arrangement of curler rollers, guides between the ironer and curler rollers for guiding the folded and ironed collar between the curler rollers while these latter squeeze the collar and impart a curled set to the collar, and mechanism for rotating the dampener wheels, ironer disc wheel, and curler rollers at appropriate peripheral speeds, substantially as herein set forth.

3. In a machine for laundry finishing double fold collars a dampener consisting of two rotary wheels one mounted above but slightly out of the plane of the other, and one comprising two discs one of which is relatively fixed and the other adjustable, an intermediate porous washer, and means for compressing the washer, the shaft of the wheel being hollow and connected with a reservoir for the supply of water to the washer and the shaft of one wheel being mounted in pivoted and sliding bearings, whereby said wheel may be yieldingly held against the other wheel, or the collar between said wheels, under the action of a spring, substantially as herein set forth.

4. In a machine for laundry finishing double fold collars, a rotary dampener, a folder and ironer lying one immediately in advance of the other, and each comprising a heated saddle-shaped member and a large disc wheel common to both, the folder being stationary and the ironer being yieldingly and adjustably supported, above the disc wheel, and said dampener, disc wheel and heated members being arranged successively in the path of the dampened part of a collar passing through the machine, as set forth.

5. In a machine for laundry finishing double fold collars, dampening wheels, a guide and support immediately in front of the dampener wheels on which the collars in a flat starched state are supported while being fed between the dampener wheels, the guide being arched transversely and inclined longitudinally and provided with a fixed presser foot, the guide and presser foot in addition to guiding the collars serving to slightly arch the collars previous to dampening, substantially as herein set forth.

6. In a machine for laundry finishing double fold collars the combination with a rotary dampener of a folder comprising a disc wheel and a saddle-shaped part lying astride a portion of the periphery of the disc wheel, and means for rotating the disc wheel synchronously with the dampener, an ironer cooperating with the disc wheel, the dampener, folder and ironer being arranged successively in the path of a part of a collar passing through the machine, as set forth.

In testimony whereof we have signed our names to this specification.

THOMAS WARDROP.
JOHN CHANT.